(12) United States Patent
Suganuma

(10) Patent No.: US 11,880,573 B2
(45) Date of Patent: Jan. 23, 2024

(54) DISK ARRAY DEVICE, DISK ARRAY CONTROL DEVICE, AND DISK ARRAY CONTROL METHOD

(71) Applicant: NEC Platforms, Ltd., Kawasaki (JP)

(72) Inventor: Shigeru Suganuma, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 219 days.

(21) Appl. No.: 17/312,098

(22) PCT Filed: Dec. 18, 2019

(86) PCT No.: PCT/JP2019/049584
§ 371 (c)(1),
(2) Date: Jun. 9, 2021

(87) PCT Pub. No.: WO2020/130034
PCT Pub. Date: Jun. 25, 2020

(65) Prior Publication Data
US 2022/0027060 A1    Jan. 27, 2022

(30) Foreign Application Priority Data
Dec. 18, 2018 (JP) .................................. 2018-236633

(51) Int. Cl.
*G06F 3/06* (2006.01)

(52) U.S. Cl.
CPC ............ *G06F 3/0619* (2013.01); *G06F 3/067* (2013.01); *G06F 3/0653* (2013.01)

(58) Field of Classification Search
CPC ...... G06F 3/0619; G06F 3/0653; G06F 3/067; G06F 11/1088; G06F 13/00
See application file for complete search history.

(56) References Cited

U.S. PATENT DOCUMENTS

| 5,533,190 A | * | 7/1996 | Binford | ............... G11B 20/1833 |
| | | | | 714/6.21 |
| 2013/0086319 A1 | | 4/2013 | Suganuma | |
| 2016/0210210 A1 | * | 7/2016 | Li | .......................... G06F 3/0689 |

FOREIGN PATENT DOCUMENTS

| JP | 2004005162 A | 1/2004 |
| JP | 2004164675 A | 6/2004 |
| JP | 2004185256 A | 7/2004 |
| JP | 2005293263 A | 10/2005 |
| JP | 2008250462 A | 10/2008 |

(Continued)

OTHER PUBLICATIONS

International Search Report of PCT Application No. PCT/JP2019/049584 dated Mar. 24, 2020.

(Continued)

*Primary Examiner* — Hiep T Nguyen

(57) ABSTRACT

In a disk array configured to distribute and store a plurality of data on a plurality of storage devices, a disk array control device is configured to calculate recovery data for a plurality of storage devices upon detecting an incoherency in a redundant configuration without receiving an abnormality report from a storage device having written predetermined data thereon and to identify the storage device, relating to the correct recovery data determined according to a majority logic, as a storage device inviting an unfinished-writing failure.

9 Claims, 12 Drawing Sheets

(56) References Cited

FOREIGN PATENT DOCUMENTS

JP        4848533 B2    12/2011
JP      2013077062 A     4/2013

OTHER PUBLICATIONS

James S. Plank, "A Tutorial on Reed-Solomon Coding for Fault-Tolerance in Raid-like Systems", Software—Practice and Experience, Sep. 1997, pp. 995-1012, vol. 27(9).

Japanese Office Action for JP Application No. 2018-236633 dated Jan. 14, 2019 with English Translation.

Japanese Office Action for JP Application No. 2018-236633 dated Jan. 14, 2020 with English Translation.

\* cited by examiner

FIG. 4

DISK ARRAY DEVICE, DISK ARRAY CONTROL DEVICE, AND DISK ARRAY CONTROL METHOD

This application is a National Stage Entry of PCT/JP2019/049584 filed on Dec. 18, 2019, which claims priority from Japanese Patent Application 2018-236633 filed on Dec. 18, 2018, the contents of all of which are incorporated herein by reference, in their entirety.

TECHNICAL FIELD

The present invention relates to a disk array device, a disk array control device, and a disk array control method.

BACKGROUND ART

Disk array devices equipped with multiple magnetic disks are used as external storage devices for information processing devices. In addition, storage devices using SSDs (Solid State Disks) having a high-speed accessing ability are used to replace magnetic disks. To prevent loss of data, disk array devices employ redundancy technology referred to as RAIDs (Redundant Arrays of Inexpensive Disks). The RAIDs can be divided into six types of RAIDs ranging from RAID0 to RAID5 according to redundancy and coding techniques. In addition, RAID6 using coding techniques disclosed in Non-Patent Document 1 or multiple-redundant-coding techniques called double parities are known as well.

Patent Document 1 discloses a disk array device having a RAID function which may additionally provide a storage area for managing updated data on magnetic disks to detect an unfinished-writing failure on magnetic disks. Specifically, a normal storage area and a coded-information storage area are formed on magnetic disks, wherein, when reading data from a magnetic disk, the coded information is read from another magnetic disk and compared to the calculation result of data. A failed magnetic disk is identified based on mismatch of coherency between the calculation result and the coded information, and therefore it is possible to secure data via fallback of magnetic disks.

Patent Document 2 discloses a technology of preventing a system-down event due to a disk failure of a storage device made up of multiple hard disks (hard disk drives) having a RAID configuration before it happens and reducing recovery works. Specifically, auxiliary hard disks will be provided to the storage device, which is configured to determine the effective data according to a majority logic due to mismatch of coherency between data written onto hard disks. After determining effective data, a disk-check operation is carried out with respect to hard disks sorted as a minority, wherein upon determining an inability to recover hard disks, hard disks suffering from failure will be replaced with auxiliary hard disks.

Patent Document 3 discloses a disk array device having a RAID3 configuration, wherein upon finding inconsistency in coherency of read parities to be checked when reading data, a CRC (Cyclic Redundancy Check) is carried out by reconfiguring host data using parities and divided data of other disk devices. Patent Document 4 discloses a disk array system having a RAIDS configuration configured to carry out reconfiguration up to expansion-completion addresses including additional hard disks according to a RAIDS reconfiguration method using capacity-expansion-completion addresses which will be updated when all the distributed data are allocated to hard disks.

CITATION LIST

Patent Document

Patent Document 1: Japanese Patent No. 4848533
Patent Document 2: Japanese Patent Application Publication No. 2004-5162
Patent Document 3: Japanese Patent Application Publication No. 2004-16467
Patent Document 4: Japanese Patent Application Publication No. 2004-185256

Non-Patent Literature Document

Non-Patent Document 1: James S. Plank, "A Tutorial on Reed-Solomon Coding for Fault-Tolerance in Raid-like Systems", Software-Practice and Experience, Volume 27, Number 9, pp. 995-1012, September 1997

SUMMARY OF INVENTION

Technical Problem

When a disk array device experiences an "unfinished-writing failure", i.e., an event failed to actually write data into magnetic disks, irrespective of a normal writing-completion report on magnetic disks, it is difficult to identify magnetic disks suffering from a writing failure. Specifically, it is necessary to address problems (1), (2) as follows.

(1) The RAID technology using data redundancy is able to recover data of a damaged magnetic disk using data of other magnetic disks but unable to detect a failure for each magnetic disk. That is, the RAID technology is able to check conformity of redundant codes but unable to determine which magnetic disk invites a failure using redundant codes. In a writing process of magnetic disks, for example, a disk array device may discard data on a disk cache upon receiving a writing-completion report when magnetic disks produce a writing-completion report due to some reasons before write data are written into storage media of magnetic disks. Thereafter, when power supply is cut off in magnetic disks before write data are written into storage media, the aforementioned "unfinished-writing failure" will occur due to a failure of updating data on magnetic disks causing loss of write data. When fraudulent data are written into storage media due to a power-off event occurring in the middle of writing data on a magnetic disk, a fraudulence of data will be detected on the magnetic disk, which will be isolated from a disk array device as a failed disk. In this case, it is possible to recover data using the redundant configuration of RAID. In the "unfinished-writing failure", however, legacy data (i.e., a previous generation of data) may not be regarded as fraudulent data because legacy data may remain on the magnetic disk, which will demonstrate an incapacity to detect failure. Due to the occurrence of the "unfinished-writing failure", it is not possible to recover data using the RAID technology and the multiple-redundant coding technique of Non-Patent Document 1.

(2) The occurrence of an "unfinished-writing failure" may lead to a failure of checking coherency of the redundant configuration; hence, it is not possible to guarantee validity of data on other magnetic disks. That is, it is preferable that fraudulence of data can be detected on any magnetic disks when checking coherency of RAID (coherency check) using redundant codes, however, the "unfinished-writing failure"

makes it difficult to identify fraudulent magnetic disks; hence, it is difficult to guarantee data on normal magnetic disks.

The method of Patent Document 1 may provide a solution to the first problem, but the method needs to add a management control area to magnetic disks, which in turn reduces an available area of magnetic disks, thus causing another problem of increasing the access frequency of magnetic disks according to the updating process. The method of Patent Document 2 relates to the second problem and may provide a solution to regard disks having effective data written thein according to a majority logic as valid disks. However, the method needs to install auxiliary hard disks, the number of which depends on the redundancy, in addition to the existing hard disks, thus causing another problem of degrading capacity efficiency over the entire storage device. Patent Document 3 and Patent Document 4 provide a reconfiguration method of disk arrays but fail to provide a solution to the "unfinished-writing failure".

The present invention aims to provide a disk array device, a disk array control device, and a disk array control method, which can solve the aforementioned problems.

Solution to Problem

In a first aspect of the present invention, a disk array control device applied to a disk array configured to distribute and store a plurality of data on a plurality of storage devices includes a storage-device-identifying unit configured to calculate recovery data for a plurality of storage devices upon detecting an incoherency in a redundant configuration without receiving an abnormality report from a storage device having written predetermined data thereon and to thereby identify the storage device, relating to the correct recovery data determined according to a majority logic, as a storage device inviting an unfinished-writing failure.

In a second aspect of the present invention, a disk array device includes a disk array configured to distribute and store a plurality of data on a plurality of storage devices, and a disk array control device configured to calculate recovery data for a plurality of storage devices upon detecting an incoherency in a redundant configuration without receiving an abnormality report from a storage device having written predetermined data thereon and to thereby identify the storage device, relating to the correct recovery data determined according to a majority logic, as a storage device inviting an unfinished-writing failure.

In a third aspect of the present invention, a disk array control method applied to a disk array configured to distribute and store a plurality of data on a plurality of storage devices includes: detecting an incoherency in a redundant configuration without receiving an abnormality report from a storage device having written predetermined data thereon; calculating the recovery data for a plurality of storage devices; and identifying the storage device, relating to the correct recovery data determined according to a majority logic, as a storage device inviting an unfinished-writing failure.

In a fourth aspect of the present invention, a program for controlling a disk array configured to distribute and store a plurality of data on a plurality of storage devices causes a computer to implement: a step for detecting an incoherency in a redundant configuration without receiving an abnormality report from a storage device having written predetermined data thereon; a step for calculating the recovery data for a plurality of storage devices; and a step for identifying the storage device, relating to the correct recovery data determined according to a majority logic, as a storage device inviting an unfinished-writing failure.

Advantageous Effects of Invention

According to the present invention, it is possible to identify magnetic disks inviting an unfinished-writing failure in a disk array device configured of multiple storage devices (magnetic disks).

BRIEF DESCRIPTION OF DRAWINGS

FIG. 4 is a schematic chart showing another computation example of the RAID-computation unit installed in the disk array device according to one exemplary embodiment of the present invention.

DESCRIPTION OF EXEMPLARY EMBODIMENT

Figure 1:
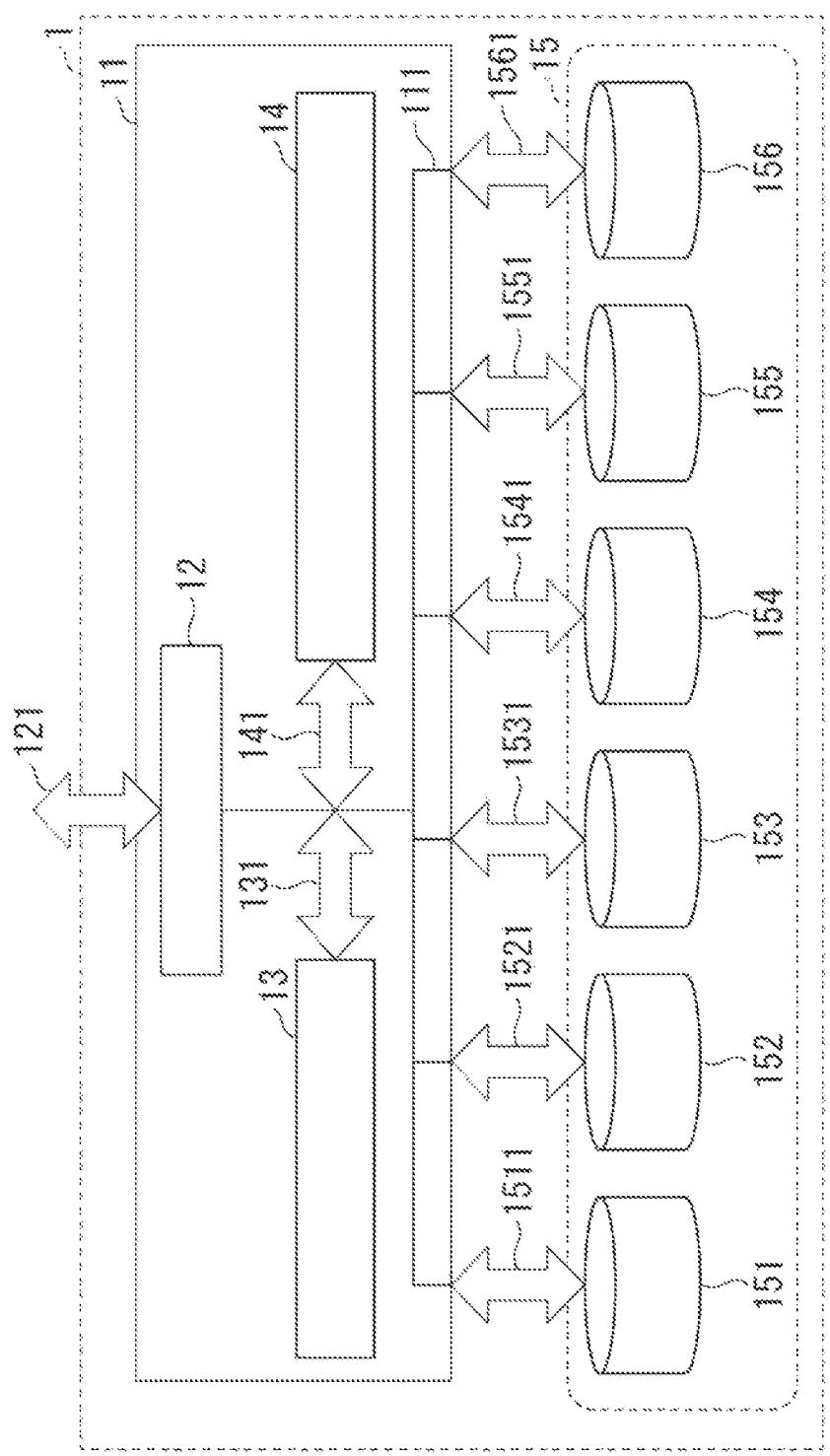
FIG. 1 is a block diagram showing a disk array device according to one exemplary embodiment of the present invention.

A disk array device, a disk array control device, and a disk array control method according to the present invention will be described in detail by way of examples with reference to the accompanying drawings. FIG. 1 is a block diagram showing a disk array device 1 according to one exemplary embodiment of the present invention. The disk array device 1 includes a disk array controller 11 and a disk array 15 having multiple magnetic disks. The disk array controller 11 includes an upper-host-connecting port 12 a RAID-computation unit 13, and a disk cache 14. The RAID-computation unit 13 and the disk cache 14 are connected to the disk array controller 11, other circuitry, and an internal interface 111 via their internal interfaces 131 and 141. The disk cache 14 may increase the processing speed of reading or writing data with disk array 15.

The disk array 15 includes magnetic disks 151 through 156. The disk array controller 11 is connected to the magnetic disks 151 through 156 via interconnection interfaces 1511 through 1561 coupled with the internal interface 111. For example, the disk array controller 11 is connected to the magnetic disk 151 via the interconnection interface 1511 and the magnetic disk 152 via the interconnection interface 1521 in connection with the internal interface 111. The magnetic disks 151 through 156 are formulated in the redundancy configuration of RAID6.

Using the upper-host-connecting port 12, the disk array controller 11 is connected to a host device (not shown) via a host-connecting interface 121. The host device is configured to issue instructions for reading or writing data with the disk array device 1. Reading instructions and writing instructions from the host device are transmitted to the RAID-computation unit 13 and the disk cache 14 via the internal interfaces 131, 141 and transmitted to the magnetic disks 151 through 156 via the internal interface 111. The disk array controller 11 is configured to control the RAID-computation unit 13 and the disk cache 14 and to thereby read or write data with the magnetic disks 151 through 156.

Figure 2:
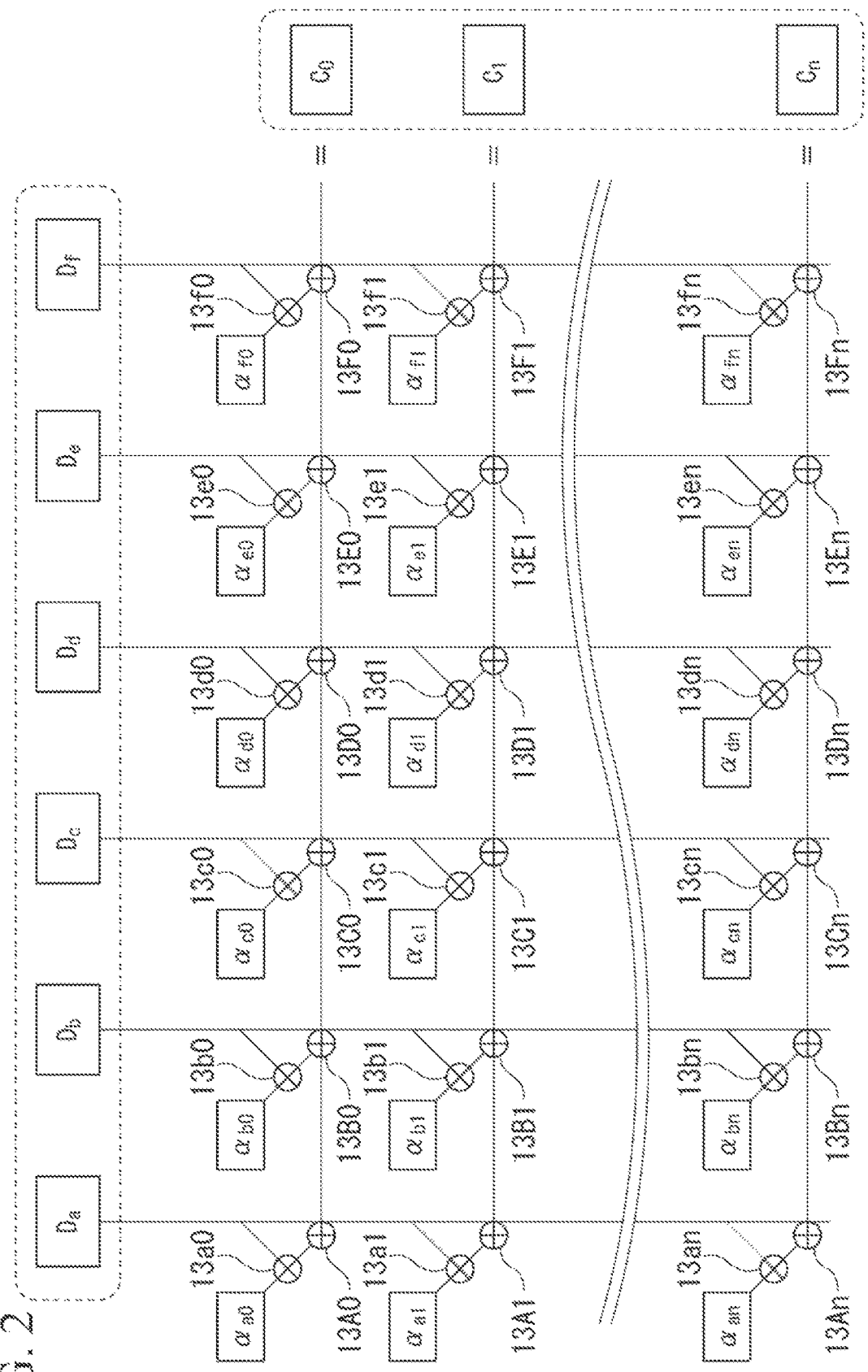
FIG. 2 is a circuit diagram showing a computation configuration of a RAID-computation unit installed in the disk array device according to one exemplary embodiment of the present invention.

FIG. 2 is a circuit diagram showing a computation configuration of the RAID-computation unit 13 installed in the disk array controller 11 of the disk array device 1. The RAID-computation unit 13 includes a plurality of multipliers 13a0 through 13f0, 13a1 through 13f1, ..., 13an through 13fn (where n denotes an integer above two), and a plurality of adders 13A0 through 13F0, 13A1 through 13F1, ..., 13An through 13Fn. The multipliers 13a0 through 13f0, 13a1 through 13f1, ..., 13an through 13fn are given coefficients $\alpha_{a0}$ through $\alpha_{f0}$, $\alpha_{a1}$ through $\alpha_{f1}$, ..., $\alpha_{an}$ through $\alpha_{fn}$. The multipliers 13a0 through 13f0, 13a1 through 13f1, ..., 13an through 13fn are configured to perform multiplication between the input data of the RAID-computation unit 13 and the coefficients $\alpha_{a0}$ through $\alpha_{f0}$, $\alpha_{a1}$ through $\alpha_{f1}$, ..., $\alpha_{an}$ through $\alpha_{fn}$ on Galois fields or Galois field extension. In FIG. 2, a symbol "x" denote a multiplication of a product in a Galois field or a Galois field extension. The adders 13A0 through 13F0, 13A1 through 13F1, ..., 13An through 13Fn are configured to perform addition or subtraction of multiplication results on a Galois field or a Galois field extension. In FIG. 2, a symbol "+" denotes an XOR (Exclusive-OR) operation on a Galois field or a Galois field extension. Accordingly, the RAID-computation unit 13 is configured to input data $D_a$ through $D_f$ and to thereby output computation results $C_0$ through $C_n$. As described in Non-Patent Document 1, Galois fields and Galois field extensions have different requirements according to the necessity of redundancy. The circuit diagram of FIG. 2 is an example of circuit; but this is not a restriction. In addition, the present embodiment is not necessarily limited in particular in terms of Galois fields and Galois field extensions used for the RAID-computation unit 13. The RAID-computation unit 13 is configured to calculate multiple redundant codes using the computation configuration shown in FIG. 2, to check coherency, and to perform reconfiguration computation. For example, the disk array controller 11 is configured to disperse and write multiple redundant codes, which are calculated by the RAID-computation unit 13, onto the magnetic disks 151 through 156 together with the data $D_a$ through $D_f$ which are instructed to be written onto magnetic disks by a host device.

Figure 3:
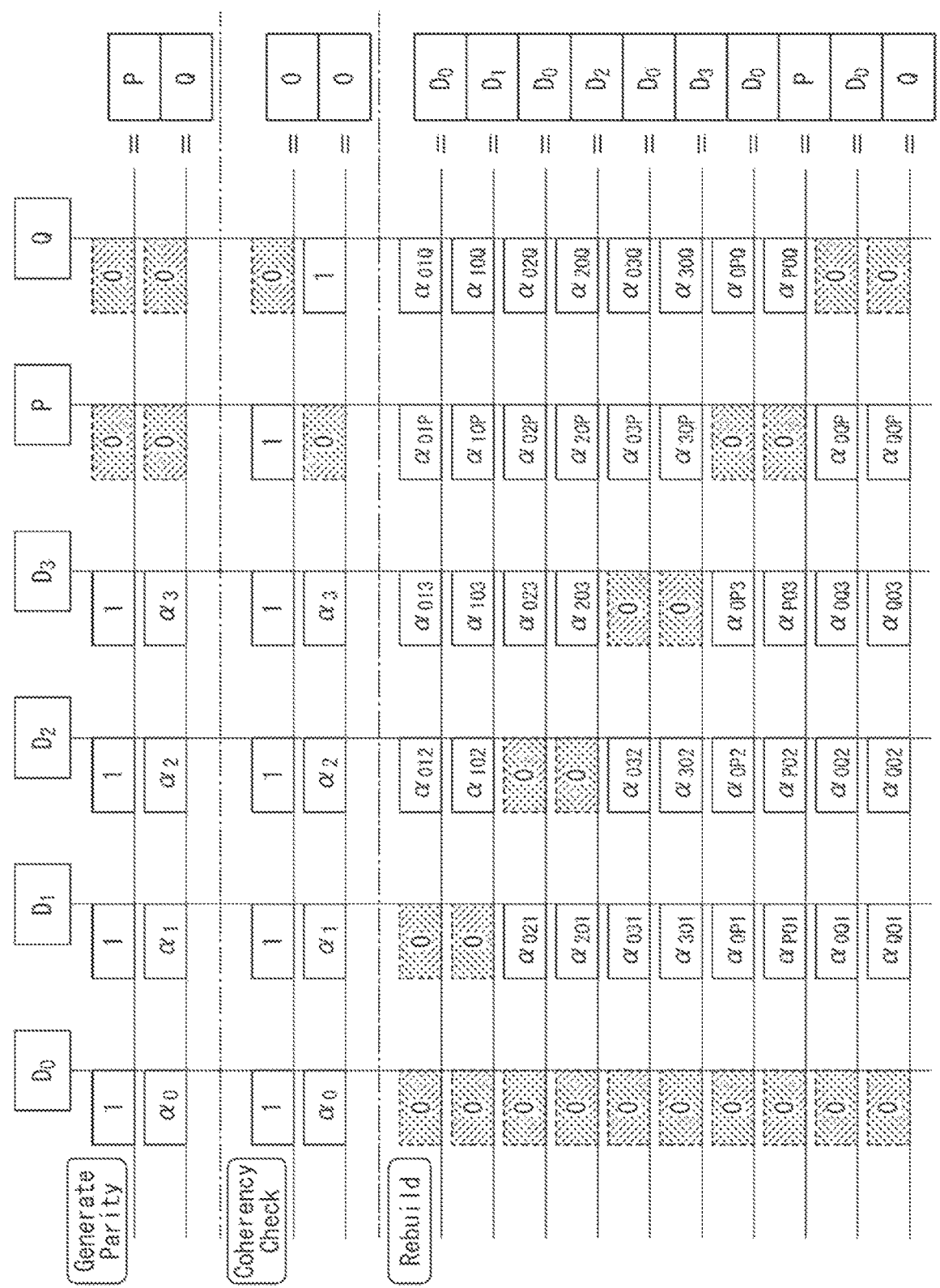
FIG. 3 is a schematic chart showing a computation example of the RAID-computation unit installed in the disk array device according to one exemplary embodiment of the present invention.
Figure 4:
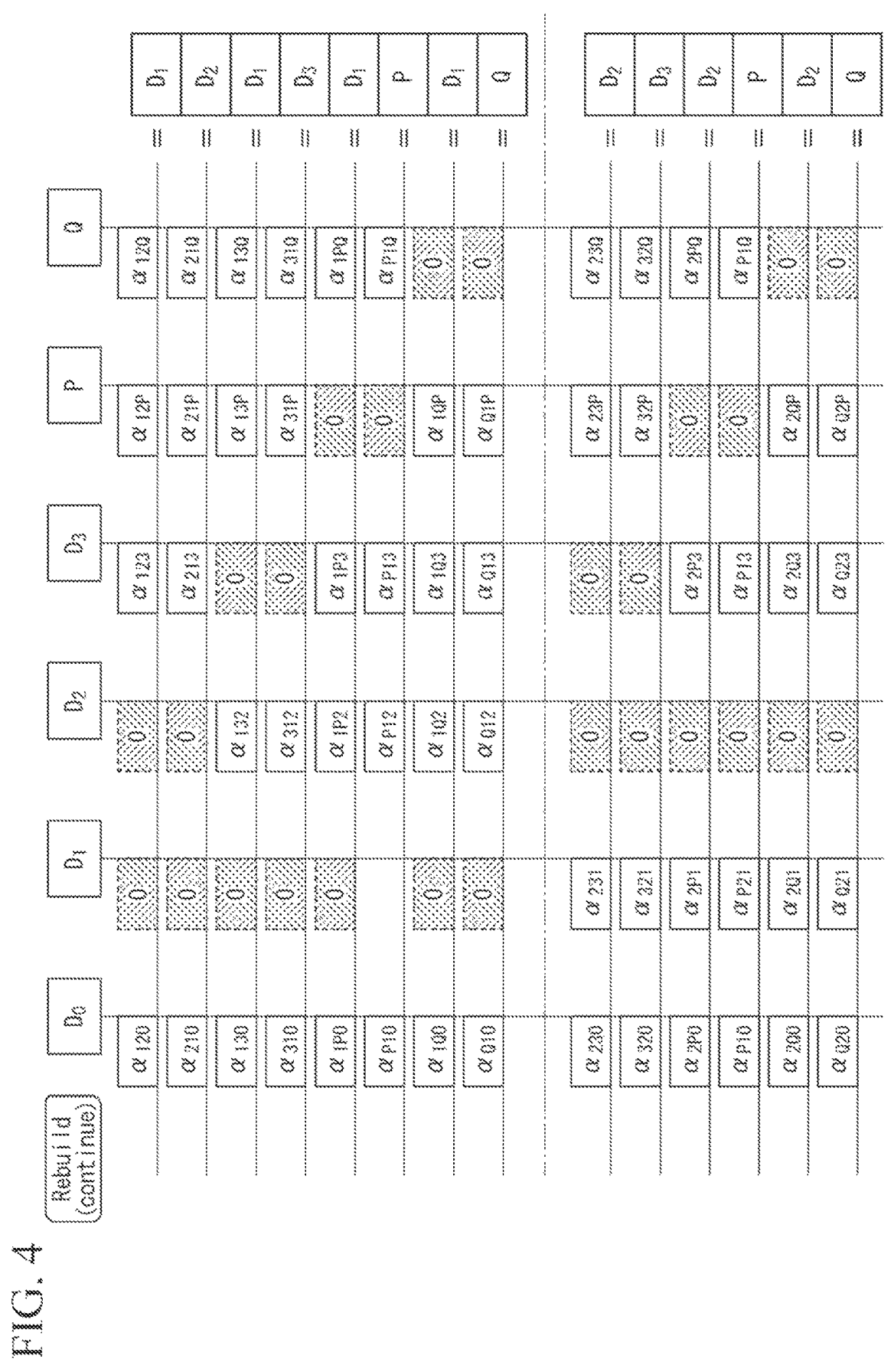
Figure 5:
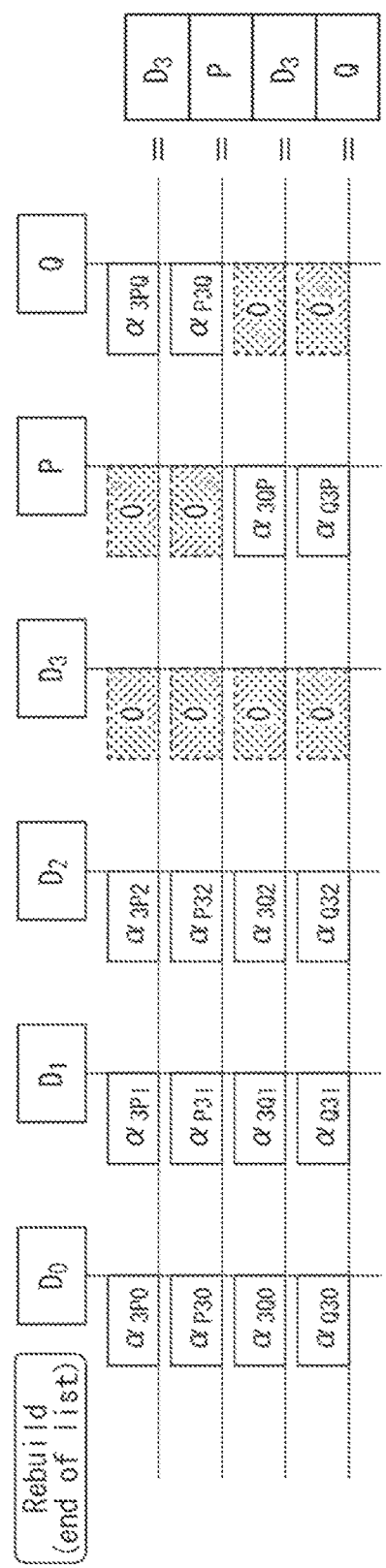
FIG. 5 is a schematic chart showing a further computation example of the RAID-computation unit installed in the disk array device according to one exemplary embodiment of the present invention.

FIGS. 3, 4, 5 are schematic charts showing examples of computation performed by the RAID-computation unit 13 installed in the disk array controller 11 of the disk array device 1. Examples of computation which are performed by the RAID-computation unit 13 with respect to the disk array 15 having the RAID6 configuration including six magnetic disks 151 through 156 will be described with reference to FIGS. 3 through 5. In FIG. 3, the coefficients $\alpha_0$ through $\alpha_3$ in a Galois field or a Galois field extension can be determined using primitive roots of Galois fields according to the method of Non-Patent Document 1, however, it is possible to determined coefficients according to other methods if redundancy is secured. FIG. 3 shows configuration examples of computation in multiple lines, wherein the first two lines a configuration example of the RAID-computation unit 13 (Generate Parity) configured to calculate normal redundant codes P and Q. For example, the first line indicates an operation to multiply the write data $D_0$ through $D_3$ by the coefficient "1" and to add their products together to produce the redundant code P. The second line indicates an operation to add a value produced by multiplying the data $D_0$ by $\alpha_0$, a value produced by multiplying the data $D_1$ by $\alpha_1$, a value produced by multiplying the data D2 by $\alpha_2$, and a value produced by multiplying the data $D_3$ by $\alpha_3$ together, thus producing the redundant code Q.

In FIG. 3, the next two lines show a configuration example of checking coherency (Coherency Check). For example, the third line indicates an operation to read the write data $D_0$ through $D_3$ and the redundant code P from the disk array 15, to calculate the redundant code P using the write data $D_0$ through $D_3$ as described above in the first line, and to produce a difference between the calculated redundant code P and the redundant code P read from the disk array 15. The fourth line indicates an operation to read the write data $D_0$ through $D_3$ and the redundant code Q from the disk array 15, to calculate the redundant code Q using the write data $D_0$ through $D_3$ as described above in the second line, and to produce a difference between the calculated redundant code Q and the redundant code Q read from the disk array 15. Both the computation result of the third line and the computation result of the fourth line indicating zeros demonstrate that the data $D_0$ through $D_3$ are normally written into the disk array 15. In this connection, the coherency check is performed in a predetermined cycle or in a data-reading mode.

In FIG. 5, the fifth line and its ongoing lines (Rebuild) indicates an operation (or reconfiguration computation) to recover data written in magnetic disks indicating abnormality when abnormality occurs in the disk array 15. For example, the fifth line indicates an operation to calculate the data $D_0$ using the data $D_2$, $D_3$, the redundant codes P, Q, and the coefficients $\alpha_{012}$, $\alpha_{013}$, $\alpha_{01P}$, $\alpha_{01Q}$. The sixth line indicates an operation to calculate the data $D_1$ using the data $D_2$, $D_3$, the redundant codes P, Q, and the coefficients $\alpha_{102}$, $\alpha_{103}$, $\alpha_{10P}$, $\alpha_{10Q}$. The same thing can be said to examples of computation in the seventh line and its ongoing lines in FIG. 3, examples of computation in FIG. 4, and examples of computation in FIG. 5. In this connection, the coefficients $\alpha_{012}$, $\alpha_{013}$, . . . may be univocally determined using the coefficients $\alpha_0$ through $\alpha_3$ according to the RAID configuration.

In a normal operation mode, the RAID-computation unit 13 is configured to perform the operations (i.e., addition of redundant codes and coherency check) of the first to fourth lines in FIG. 3. Due to failure occurring on magnetic disks or upon detecting mismatch of coherency due to the "unfinished-writing failure", the RAID-computation unit 13 needs to perform the reconfiguration computation (Rebuild) of the fifth line and its ongoing lines in FIG. 3. Due to failure occurring on magnetic disks, it is necessary to select lines needed for reconfiguration among the reconfiguration-computation patterns described in the fifth line and its ongoing lines in FIG. 3. When a "unfinished-writing failure" occurs on a magnetic disk, i.e., when the failure of a magnetic disk is not reported upon detecting mismatch of coherency, the RAID-computation unit 13 may carry out all the reconfiguration-computation patterns to identify a magnetic disk inviting the "unfinished-writing failure".

Figure 6:
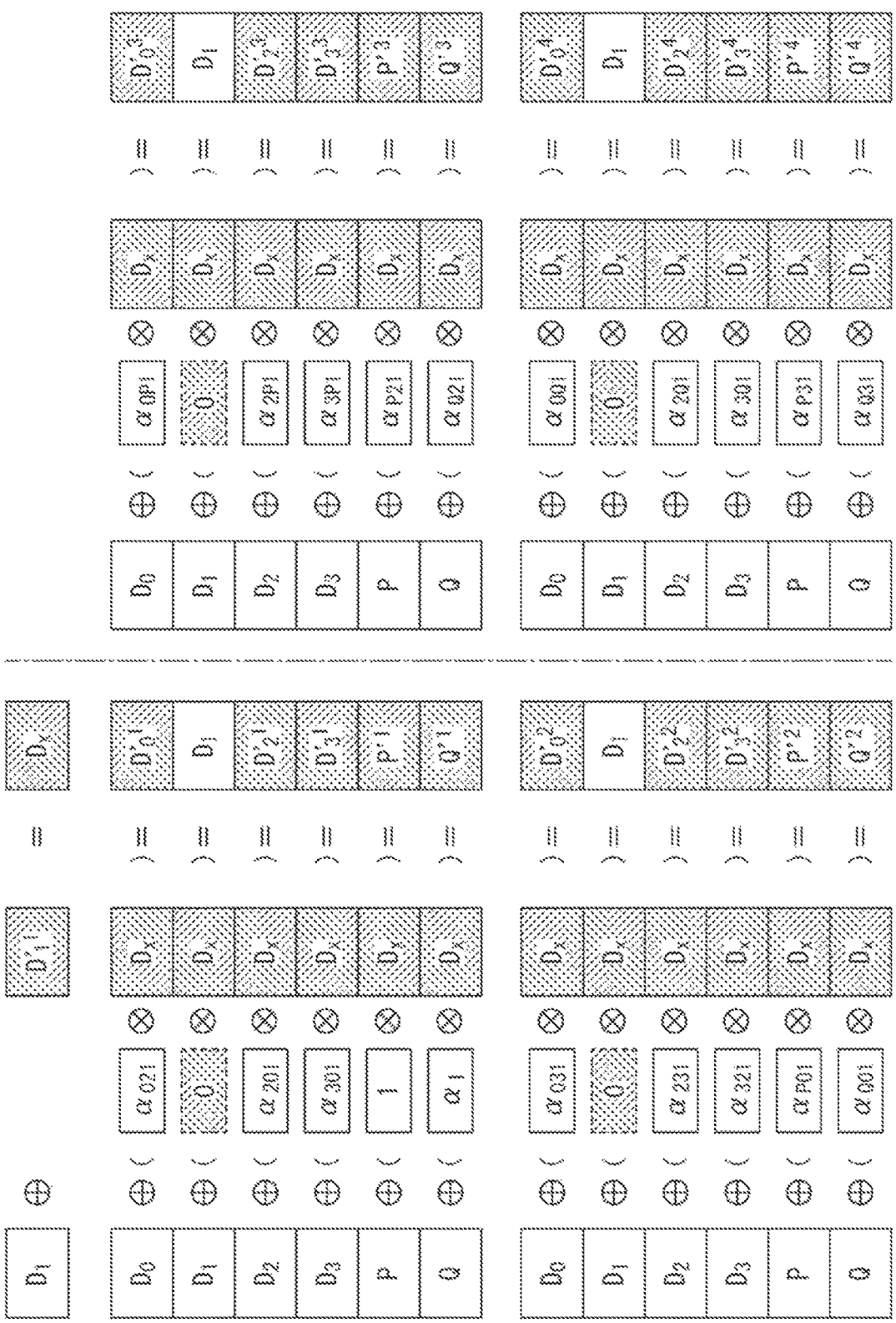
FIG. 6 is a schematic chart showing an example of results of reconfiguration computation by the RAID-computation unit installed in the disk array device according to one exemplary embodiment of the present invention upon occurrence of an incoherency.

FIG. 6 is a schematic chart showing an example of results of reconfiguration computation performed by the RAID-computation unit 13 installed in the disk array controller 11 of the disk array device 1 experiences mismatch of coherence. FIG. 6 shows an impact on reconfiguration computation when an "unfinished-writing failure" occurs on a magnetic disk which the data $D_1$ has been written into. In this connection, it is possible to assume a symbol Dx representing a difference between the correct data $D_1$ (i.e., the original data $D_1$ to be written into a magnetic disk) and incorrect data $D_1'$ (i.e., one-generation previous data) in the first line of FIG. 6. In FIG. 6, the second line and its ongoing lines show the results of reconfiguration computation with respect to the data $D_0$ through $D_3$ and the redundant codes P, Q. For example, the second line of FIG. 6 shows the data $D_0$, a result of multiplication between the coefficient $\alpha_{021}$ and the difference Dx, and an addition result $D'_0{}^1$. In addition, FIG. 3 though FIG. 5 show multiple methods of reconfiguration computation with respect to the data $D_0$ through $D_3$ and the redundant codes P, Q. As to the data $D_0$, for example, the sixth line of FIG. 3 as well as the first line, the third line, the fifth line, and the seventh line of FIG. 4 show examples of reconfiguration computation. FIG. 6 shows part of results relating to the data $D_1$ in the reconfiguration computation performed on the data $D_0$ through $D_3$ and the redundant codes P, Q according to any one of the aforementioned reconfiguration computation methods. As shown in FIG. 6, computation results will be fluctuated by a value produced by multiplying the coefficient $\alpha$ and the difference Dx. When the coefficient $\alpha$ is zero, however, computation results will not be affected by the difference Dx; hence, it is possible to produce normal values (e.g., the computation result described in the third line of FIG. 6). For example, the case the coefficient $\alpha$ equals to zero may correspond to the case of reconfiguration computation performed on the data $D_1$. According to this property, the present exemplary embodiment is able to identify a magnetic disk inviting an "unfinished-writing failure".

Figure 7:
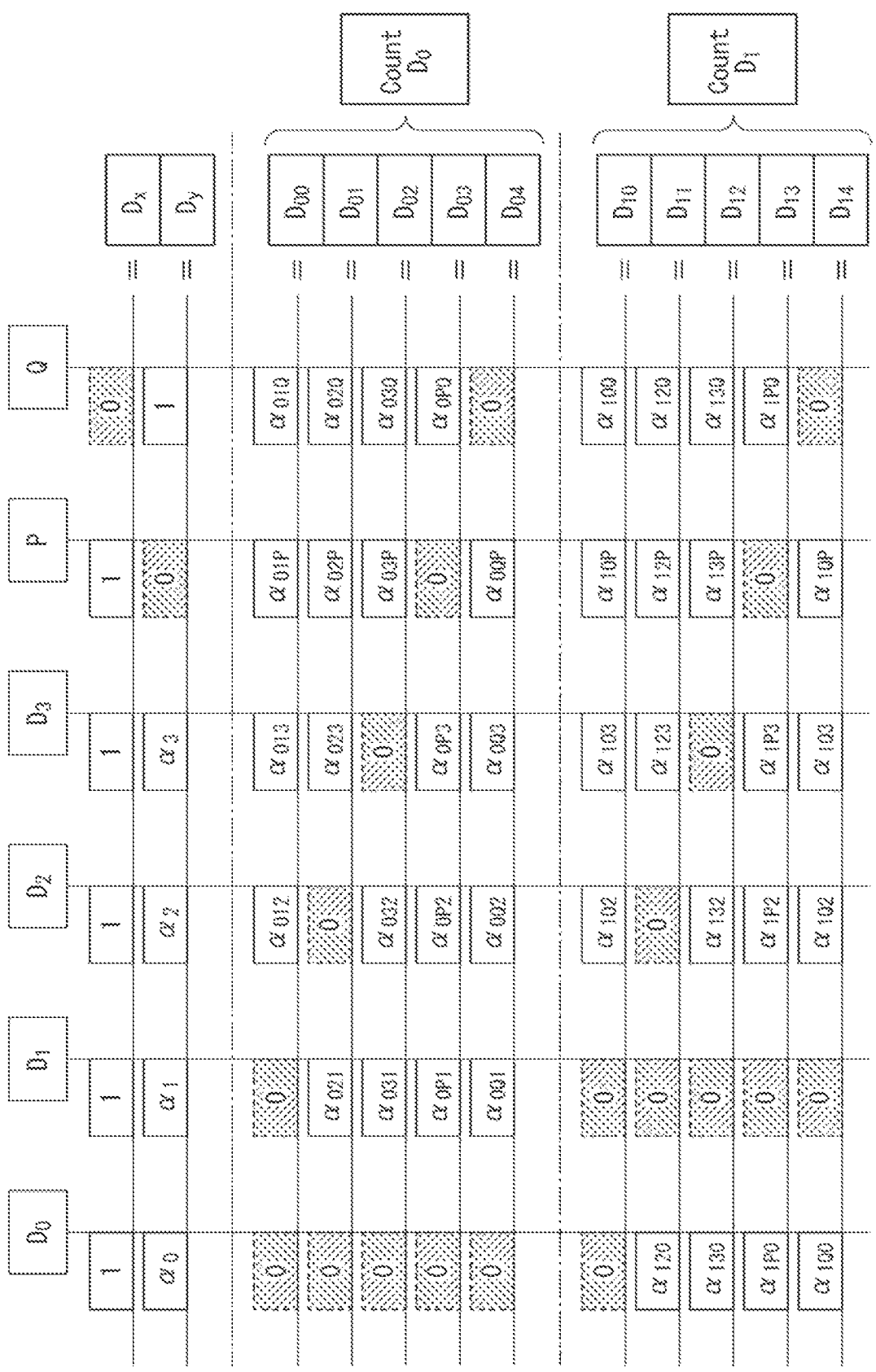
FIG. 7 is a schematic chart showing the results of reconfiguration computation by the RAID-computation unit installed in the disk array device according to one exemplary embodiment of the present invention.
Figure 8:
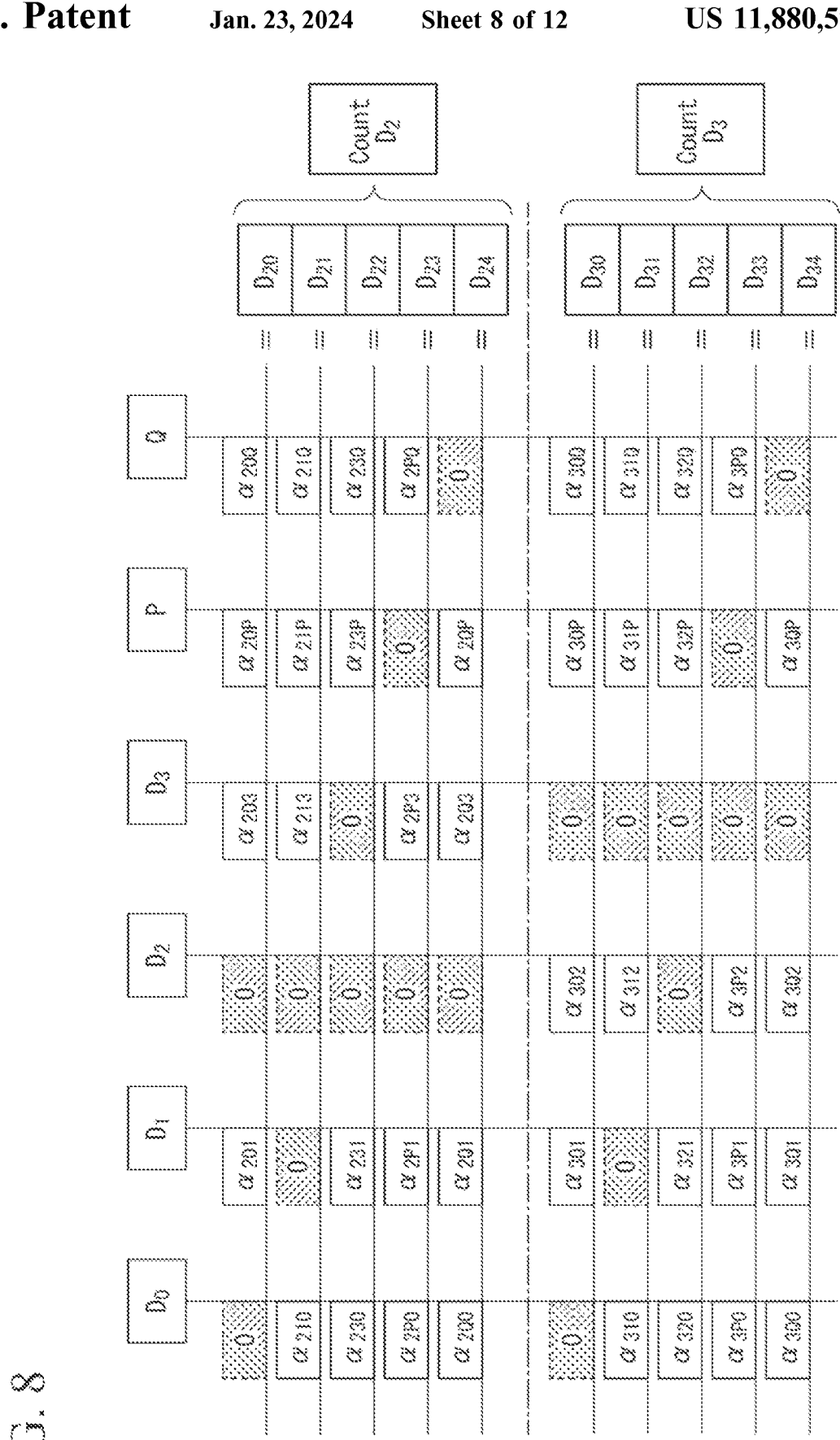
FIG. 8 is a schematic chart showing the results of reconfiguration computation by the RAID-computation unit installed in the disk array device according to one exemplary embodiment of the present invention.
Figure 9:
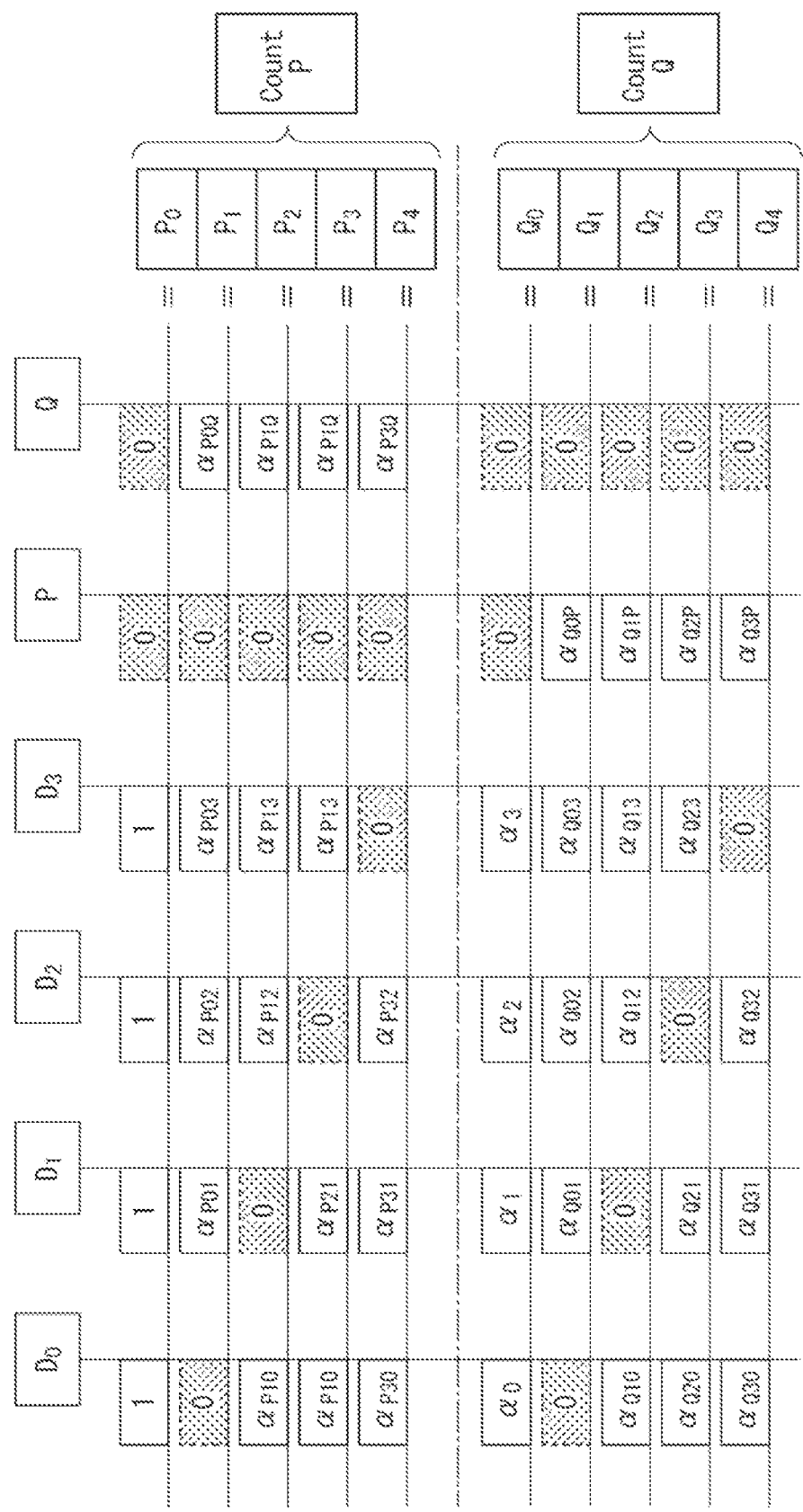
FIG. 9 is a schematic chart showing the results of reconfiguration computation by the RAID-computation unit installed in the disk array device according to one exemplary embodiment of the present invention.

FIGS. 7, 8, 9 are schematic charts showing results of reconfiguration computation performed by the RAID-computation unit 13 installed in the disk array controller 11 of the disk array device 1. FIGS. 7 through 9 are created to reorganize and sort results of reconfiguration computation (Rebuild) shown in FIGS. 3 through 5 with respect to individual data to be reconfigured. In addition, FIGS. 7 through 9 additionally introduce "Count $D_0$" through "Count $D_3$", "Count P", and "Count Q" as configurations to identify magnetic disks each inviting an "unfinished-writing failure". Herein, the reconfiguration results $D_{00}$ through $D_{04}$ show the values of the data $D_0$ produced by reconfiguration computation according to different methods. The value of "Count $D_0$" represents the number of reconfiguration results indicating the same value among the reconfiguration results $D_{00}$ through $D_{04}$. When all the reconfiguration results $D_{00}$ through $D_{04}$ indicate the same value, for example, the value of "Count $D_0$" is "5". Similarly, the value of "Count $D_1$" represents the number of reconfiguration results indicating the same value among the reconfiguration results $D_{10}$ through $D_{14}$ relating to the data $D_1$. The same thing can be said to "Count $D_2$" relating to the data $D_2$ and "Count $D_3$" relating to the data $D_3$. In addition, the value of "Count P" represents the number of reconfiguration results indicating the same value among the reconfiguration results $P_0$ through $P_4$ of reconfiguration computation relating to the redundant code P. Moreover, the value of "Count Q" represents the number of reconfiguration results indicating the same value among the reconfiguration results $Q_0$ through $Q_4$ of reconfiguration computation relating to the redundant code Q.

Figure 10:
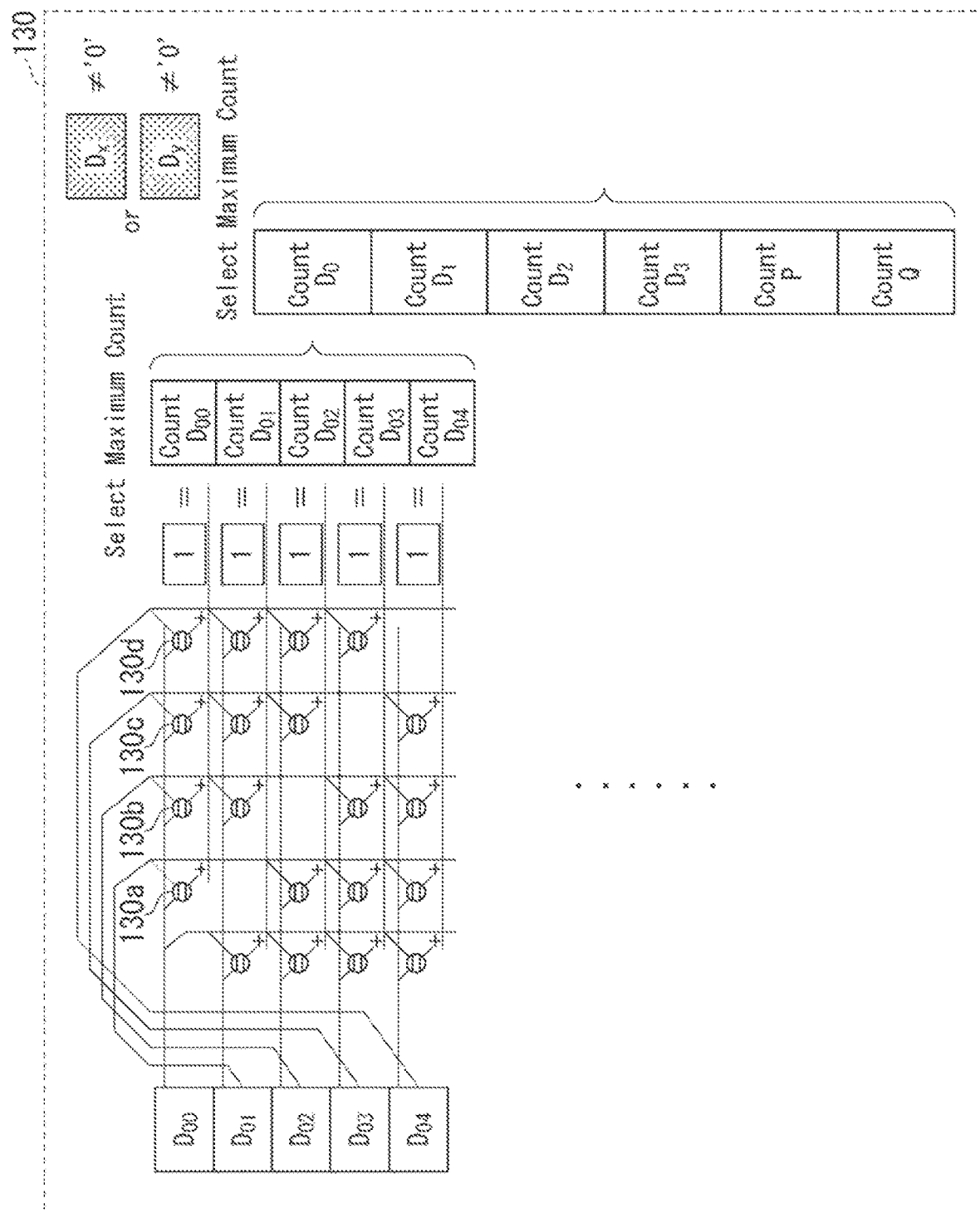
FIG. 10 is a configuration diagram showing one example of computation of the RAID-computation unit installed in the disk array device according to one exemplary embodiment of the present invention.

Next, a computation method of "Count $D_0$" will be described with reference to FIG. 10. FIG. 10 is a configuration diagram showing an example of computation processing performed by the RAID-computation unit 13 installed in the disk array controller 11 of the disk array device 1. The RAID-computation unit 13 includes a calculation unit 130 shown in FIG. 10. The RAID-computation unit 13 is configured to determine whether to detect mismatch of coherency of redundant codes using Dx, Dy, wherein upon determining mismatch of coherency, the RAID-computation unit 13 may carry out the reconfiguration computation and the computation of "Count $D_0$" through "Count $D_3$", "Count P", and "Count Q". The calculation unit 130 includes multiple comparators 130*a* through 130*d* and multiple adders. The calculation unit 130 is configured to perform matrix calculations to mutually compare the reconfiguration results $D_{00}$ through $D_{04}$, wherein when all the outputs of the comparators 130*a* through 130*d* "match" each other, the calculation unit 130 may add up comparison results of their corresponding lines. Specifically speaking about the line of the reconfiguration result $D_{00}$, the comparator 130*a* compares the reconfiguration results $D_{00}$ and $D_{01}$, wherein the comparator 130*a* may output "1" when the reconfiguration results indicate the same value but the comparator 130*a* output "0" when the reconfiguration results differ from each other. Similarly, the comparator 130*b* compares the reconfiguration results $D_{00}$ and $D_{02}$, the comparator 130*c* compares the reconfiguration results $D_{00}$ and $D_{03}$, the comparator 130*d* compares the reconfiguration results $D_{00}$ and $D_{04}$. When all the reconfiguration results D00 through D04 indicate the same value, it is possible to produce "4" as the result of adding the outputs of the comparators 130*a* through 130*d*. The comparison result produced by comparing sources (e.g., the first line of FIG. 10 indicates the comparison source D00) is included in the number of matches; hence, "1" should be added to the addition result at last. As described above, the calculation unit 130 is configured to calculate "Count $D_{00}$". Similarly, the calculation unit 130 is configured to calculate "Count $D_{01}$" through "Count $D_{04}$". The calculation unit 130 may compare "Count $D_{01}$" through "Count $D_{04}$" to determine the largest value as "Count $D_0$". Similarly, the calculation unit 130 is configured to determine "Count $D_1$" through "Count $D_3$", "Count P", "Count Q".

Even when an "unfinished-writing failure" occurs on the data $D_1$, for example, the reconfiguration result $D_{00}$ will not be affected by the "unfinished-writing failure" occurring on the data $D_1$ since the coefficient applied to the data $D_1$ is "0" as shown in the third line of FIG. 7. On the other hand, the reconfiguration results $D_{01}$ through $D_{04}$ will be affected by the data $D_1$ since the coefficient applied to the data $D_1$ is not "0" as shown in the fourth to seventh lines of FIG. 7. Therefore, the result of matrix computation to compare the reconfiguration results $D_{00}$ through $D_{04}$ indicates the value of "Count $D_{00}$" at "1", and the values of "Count $D_{01}$" through "Count $D_{04}$" at "4" as shown in FIG. 10. Accordingly, the value of "Count $D_0$" is set to "4". Similarly, all the values of "Count $D_2$", "Count $D_3$", "Count P", and "Count Q" are set to "4". In contrast, the reconfiguration results $D_{10}$ through $D_{14}$ of the reconfiguration computation performed with respect to the data $D_1$ according to all patterns will not be affected by the data $D_1$ as shown in the third to thirteenth lines of FIG. 7. Therefore, all the values of "Count $D_{10}$" through "Count $D_{14}$" are set to "5" while the value of "Count $D_1$" is set to "5" as well.

As described above, when an "unfinished-writing failure" occurs on the data $D_1$, it is possible to compute normal values according to the reconfiguration computation patterns having the coefficient "0" relating to the data $D_1$ among the reconfiguration results $D_{00}$ through $D_{04}$, $D_{10}$ through $D_{14}$, $D_{20}$ through $D_{24}$, $D_{30}$ through $D_{34}$, $P_0$ through $P_4$, and $Q_0$ through $Q_4$. With reference to FIG. 7 through FIG. 9, all the five reconfiguration computation methods relating to the data $D_1$ may have the coefficients "0". Therefore, all the comparison results produced by comparing the reconfiguration results $D_{10}$ through $D_{14}$ may have the same value. Among the five reconfiguration computation methods relating to the data $D_0$, $D_2$, $D_3$, and the redundant codes P, Q, the four reconfiguration computation methods will be affected by the data $D_1$ experiencing a writing failure. For this reason, the same value cannot be obtained from all the computation results of the five reconfiguration computation methods. Accordingly, the calculation unit 130 may select "Count $D_1$" relating to the data $D_1$ experiencing an unfinished-writing failure. This makes it possible for the RAID-computation unit 13 to detect a magnetic disk inviting an "unfinished-writing failure" (i.e., a magnetic disk which the data $D_1$ has been written into).

Since the reconfiguration computation has been completed according to the aforementioned process, the correct value of the data $D_1$ has been already obtained with respect to the data $D_1$ experiencing an "unfinished-writing failure". It is possible to normalize data on magnetic disks by means of the disk array controller 11 configured to update the data $D_1$ using the value already subjected to the reconfiguration computation, and therefore it is possible to recover the redundancy of the disk array 15.

Figure 11:
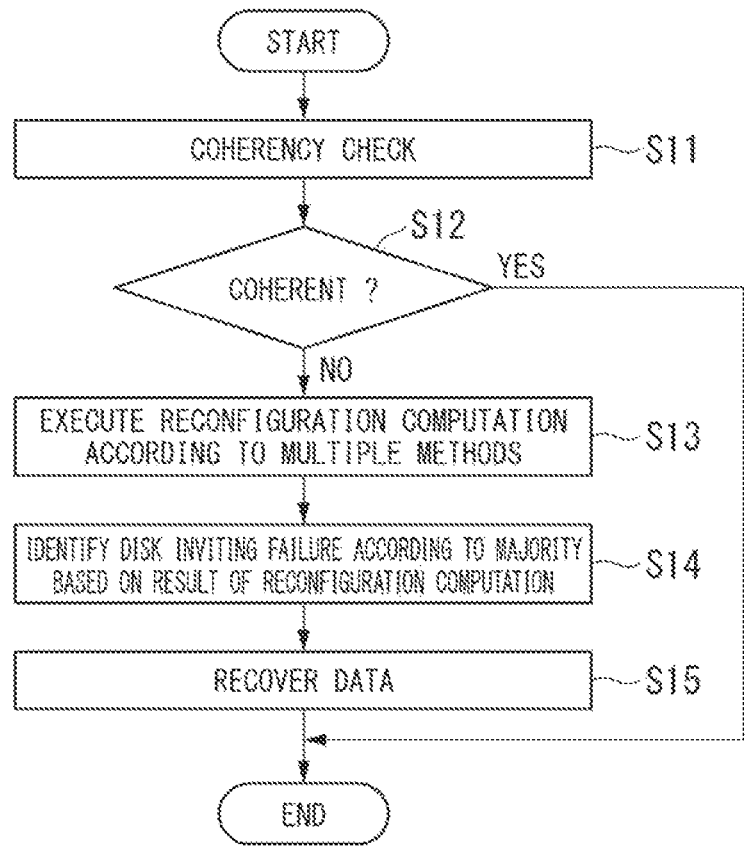
FIG. 11 is a flowchart showing a procedure for an unfinished-writing failure occurring in a disk array device according to one exemplary embodiment of the present invention.

Next, a procedure for an unfinished-writing failure occurring in the disk array device 1 will be described with reference to FIG. 11. FIG. 11 is a flowchart (steps S11 through S15) showing the procedure for an unfinished-writing failure. As described above, the data $D_0$ through $D_4$ and the redundant codes P, Q have been written into the six magnetic disks 151 through 156 installed in the disk array 15 according to the RAID5 system. First, the disk array controller 11 executes a coherency check at a predetermined timing (S11). The RAID-computation unit 13 calculates the redundant codes P, Q using the data $D_0$ through $D_4$ read from the magnetic disk 151 and the like so as to compare the calculated redundant codes P, Q with the redundant codes P, Q read from the magnetic disk 151 and the like. The RAID-computation unit 13 may determine a coherent state when the calculated redundant codes P, Q match the read redundant codes P, Q but determine an incoherent state when any one of the redundant codes P, Q does not match its corresponding redundant code (S12). Upon determining a coherent state due to match of the redundant codes P, Q (S12, YES), the disk array controller 11 exits the process of FIG. 11 since no unfinished-writing failure occurs in the disk array 15.

On the other hand, upon determining an incoherent state due to mismatch determined on any one of the redundant codes P, Q (S12, NO), the RAID-computation unit 13 may execute reconfiguration computation using the data $D_0$ through $D_4$ and the redundant codes P, Q according to multiple methods (S13). For example, the RAID-computation unit 13 may execute reconfiguration computation according to full-failure-recovery patterns shown in FIG. 7 through FIG. 9.

Next, the RAID-computation unit 13 may identify a magnetic disk inviting a failure according to a majority logic based on the result of reconfiguration computation (S14). As described above with reference to FIG. 10, for example, the RAID-computation unit 13 may compare results of reconfiguration computation executed according to full-failure-recovery patterns for data written in a single magnetic disk, thus calculating the number of reconfiguration results indicating the same value. The RAID-computation unit 13 may identify a magnetic disk having the largest number of reconfiguration results indicating the same value as a magnetic disk inviting an "unfinished-writing failure" (S14). The disk array controller 11 may write the result of reconfiguration computation on the magnetic disk identified by the RAID-computation unit 13, thus recovering the data thereof (S15). As described above with reference to FIG. 10, the execution results of reconfiguration computation will match each other with respect to the full-failure-recovery patterns for the data (e.g., the data DO written in a magnetic disk inviting an "unfinished-writing failure".

The disk array device configured to make redundant data using multiple-redundant codes as defined in the RAID6 system is able to perform reconfiguration computation with data of magnetic disks according to multiple calculation methods. The present exemplary embodiment employs the property of the RAID system using multiple-redundant codes and a majority logic to determine normal data as data frequently matched in values of reconfiguration results, wherein upon detecting incoherency when checking coherency of written data, the present exemplary embodiment may calculate recovery data according to any failure-recovery patterns with respect to magnetic disks having a redundant configuration (reconfiguration computation). Accordingly, a magnetic disk which has stored the largest number of recovery data among all the recovery data having matched in their values will be identified as a magnetic disk inviting an "unfinished-writing failure". In addition, the present exemplary embodiment may correct data written into a magnetic disk inviting an "unfinished-writing failure" using the recovery data calculated to identify a magnetic disk inviting an "unfinished-writing failure". As described above, it is possible for the present exemplary embodiment to identify a magnetic disk inviting an "unfinished-writing failure" and to restore the data originally stored on the magnetic disk. By identifying a magnetic disk inviting an "unfinished-writing failure", it is possible to guarantee validity of data with respect to other magnetic disks.

The control method of a disk array device according to the present exemplary embodiment needs to additionally introduce a process and circuitry to identify a magnetic disk inviting an "unfinished-writing failure" without needing an additional storage area on magnetic disks; hence, it is possible to prevent a reduction of capacity efficiency over the entire storage device. In a period in which data are normally written into magnetic disks, it is possible to normally operate a disk array device without the necessity of additionally executing special processes.

The aforementioned exemplary embodiment has been described using the disk array device 1 having the configuration of FIG. 1; but this is not a restriction as to the control method of a disk array device according to the present invention. For example, it is possible to achieve the control method of a disk array device with reference to a disk array device having the following functional parts.

Figure 12:
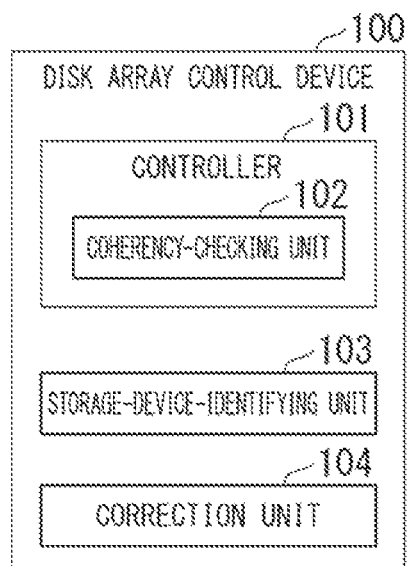
FIG. 12 is a block diagram of a disk array control device according to one exemplary embodiment of the present invention.

FIG. 12 is a block diagram of a disk array control device 100 according to one exemplary embodiment of the present invention. The disk array control device 100 includes a controller 101, a storage-device-identifying unit 103, and a correction unit 104. The controller 101 is configured to carry out various necessary operations and operations for reading and writing data with a disk array device achieving redundancy of data using multiple-redundant codes. For example, the controller 101 may achieve functionality of a RAID controller compatible to RAID6 or a RAID program, i.e., software compatible to RAID6. The controller 101 includes a coherency-checking unit 102. The coherency-checking unit 102 is configured to detect incoherency of data distributed and written into multiple magnetic disks based on multiple codes calculated from the data. For example, the coherency-checking unit 102 may carry out the process of step S11 in the flowchart of FIG. 11.

When the coherency-checking unit 102 detects mismatch of coherency of data on magnetic disks without having received a failure report from any magnetic disks, the storage-device-identifying unit 103 may calculate recovery data from multiple magnetic disks so as to identify a magnetic disk relating to recovery data, the correctness of which is determined according to a majority logic, as a magnetic disk inviting an unfinished-writing failure to write data thereon. For example, the storage-device-identifying unit 103 is configured to carry out the processes of steps S12 through S14 in the flowchart of FIG. 11. The correction unit 104 is configured to correct data by writing the recovery data, the correctness of which has been determined, into the magnetic disk which has been identified due to the occurrence of an unfinished-writing failure. For example, the correction unit 104 may carry out the process of step S15 in the flowchart of FIG. 11.

As a functional part of the disk array control device 100, it is possible to install hardware (e.g., a hardware RAID) like the RAID-computation unit 13 installed in the disk array controller 11 of the disk array device 1 or software (e.g., a software RAID). As a hardware RAID, for example, it is possible to provide a RAID controller equipped with circuitry as illustrated in FIG. 10 other than circuitry for performing computation according to the RAID6 system. As a software RAID, it is possible to store on a computer-readable storage medium a series of programs representing the processes of the functional parts such as the controller 101, the coherency-checking unit 102, the storage-device-identifying unit 103, and the correction unit 104. It is possible to achieve the foregoing processes by means of a processor installed in a disk controller for RAID control or a processor installed in a host device when reading and executing programs. Herein, computer-readable media refer to magnetic disks, opto-magnetic disks, CD-ROM, DVD-ROM, semiconductor memory, and the like. In this connection, it is possible to deliver computer programs to a computer through communication lines such that the compute can execute programs. In addition, programs may achieve part of the foregoing functionality. Moreover, programs may be differential programs (or differential files) to achieve the foregoing functionality when combined with pre-installed programs of a computer system.

Figure 13:
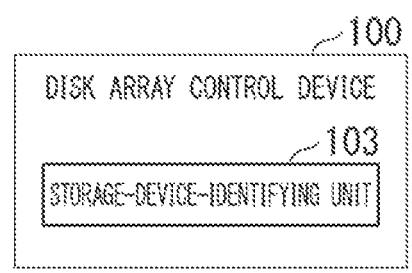
FIG. 13 is a block diagram showing a minimum configuration of a disk array control device according to one exemplary embodiment of the present invention.

FIG. 13 shows a minimum configuration of the disk array control device 100. The disk array control device 100 shown in FIG. 13 includes at least the storage-device-identifying unit 103. The disk array control device 100 may be realized by a RAID controller or an independent device independent from software-RAID programs, alternatively, the disk array control device 100 may install predetermined programs therein. When a RAID controller detects incoherency of data, for example, the storage-device-identifying unit 103 may be activated to identify a magnetic disk inviting an "unfinished-writing failure". In this connection, the disk array control device 100 may be configured to output to a RAID controller the identification information of the identified magnetic disk, the recovery data calculated for the magnetic disk, and its writing instructions.

Lastly, the present invention is not necessarily limited to the aforementioned exemplary embodiment and its variations; hence, the present invention may embrace various modifications and design changes without deviating from the subject matter of the invention as defined by the appended claims. For example, the present exemplary embodiment is designed to configure a disk array using a plurality of magnetic disks, which can be replaced with a storage device mounting an SSD thereon. In addition, a plurality of magnetic disks may be configured to store a plurality of data and redundant codes according to other configurations than the RAID configuration.

The present application claims the benefit of priority on Japanese Patent Application No. 2018-236633 filed on Dec. 18, 2018, the subject matter of which is hereby incorporated herein by reference.

INDUSTRIAL APPLICABILITY

The present invention is designed to identify a magnetic disk inviting an unfinished-writing failure in a disk array configured of a plurality of magnetic disks and to thereby recover its data; but this is not a restriction since the present invention is applicable to an information processing system configured to identify a storage device inviting a failure among a plurality of storage devices and to thereby recover its data. In addition, the present invention is applicable to a storage system configured to distribute and store a plurality of data on a plurality of storage devices according any configurations other than the RAID configuration.

REFERENCE SIGNS LIST 1 disk array device
11 disk array controller
12 upper-host-connecting port
13 RAID-computation unit
14 disk cache
100 disk array control device
101 controller
102 coherency-checking unit
103 storage-device-identifying unit
104 correction unit
151-156 magnetic disk

The invention claimed is:

1. A disk array control device applied to a disk array configured to distribute and store a plurality of data on a plurality of storage devices, comprising:
   one or more processors; and
   a memory storing program code executable by the one or more processors to calculate recovery data for the plurality of storage devices upon detecting an incoherency in a redundant configuration without receiving an abnormality report from any of the plurality of storage devices having written predetermined data thereon and to thereby identify one of the plurality of storage devices, relating to correct recovery data determined according to a majority logic, as inviting an unfinished-writing failure.

2. The disk array control device according to claim 1, wherein the program code is executable by the one or more processors to calculate the recovery data for the one of the plurality of storage devices according to a plurality of computation methods using a plurality of redundant codes and data written into other of the plurality of storage devices and to thereby determine the correct recovery data associated with a computation result having a largest number of matched values among a plurality of computation results corresponding to the plurality of computation methods.

3. The disk array control device according to claim 1, wherein the program code is executable by the one or more processors to further execute all reconfiguration computation patterns that are each executed upon occurrence of a failure in the one of the plurality of storage devices, and to thereby identify the one of the plurality of the storage devices inviting the unfinished-writing failure based on computation results of all the reconfiguration computation patterns.

4. The disk array control device according to claim 1, wherein the program code is executable by the one or more processors to further correct data of the one of the storage devices inviting the unfinished-writing failure by writing the correct recovery data, which is determined to be correct, into the one of the plurality of storage devices.

5. A disk array device comprising:
   a disk array configured to distribute and store a plurality of data on a plurality of storage devices;
   one or more processors; and
   a memory storing program code executable by the one or more processors to calculate recovery data for the plurality of storage devices upon detecting an incoherency in a redundant configuration without receiving an abnormality report from any of the plurality of storage devices having written predetermined data thereon and to thereby identify one of the plurality of storage devices, relating to correct recovery data determined according to a majority logic, as inviting an unfinished-writing failure.

6. The disk array device according to claim 5, wherein the program code is executable by the one or more processors to calculate the recovery data for the one of the plurality of storage devices according to a plurality of computation methods using a plurality of redundant codes and data written into other of the plurality of storage devices and to thereby determine the correct recovery data associated with a computation result having a largest number of matched values among a plurality of computation results corresponding to the plurality of computation methods.

7. The disk array device according to claim 5, wherein the program code is executable by the one or more processors to execute all reconfiguration computation patterns that are each executed upon occurrence of a failure in the one of the plurality of storage devices, and to thereby identify the one of the plurality of the storage devices inviting the unfinished-writing failure based on computation results of all the reconfiguration computation patterns.

8. A disk array control method applied to a disk array configured to distribute and store a plurality of data on a plurality of storage devices, comprising:
   detecting, by a processor, an incoherency in a redundant configuration without receiving an abnormality report from any of the plurality of storage devices having written predetermined data thereon;
   calculating, by the processor, recovery data for the plurality of storage devices; and
   identifying, by the processor, one of the plurality of storage devices, relating to correct recovery data determined according to a majority logic, inviting an unfinished-writing failure.

9. A non-transitory computer-readable data storage medium storing a program executable by a computer to perform processing for controlling a disk array configured to distribute and storing a plurality of data on a plurality of storage devices, the processing comprising:
   detecting an incoherency in a redundant configuration without receiving an abnormality report from any of the plurality of storage devices having written predetermined data thereon;
   calculating recovery data for the plurality of storage devices; and
   identifying one of the plurality of storage devices, relating to correct recovery data determined according to a majority logic, inviting an unfinished-writing failure.

* * * * *